United States Patent [19]

Robertson

[11] Patent Number: 5,224,587
[45] Date of Patent: Jul. 6, 1993

[54] IMPROVEMENTS IN OR RELATING TO CONVEYORS

[75] Inventor: Kelvin T. Robertson, Scarborough, England

[73] Assignee: Romech Engineering Limited, Bridlington, England

[21] Appl. No.: 859,620

[22] Filed: Mar. 23, 1992

Related U.S. Application Data

[63] Continuation of Ser. No. 523,220, May 14, 1990, abandoned.

[30] Foreign Application Priority Data

May 16, 1989 [GB] United Kingdom ............... 8911127

[51] Int. Cl.⁵ ............................................. B65G 15/02
[52] U.S. Cl. ................................... 198/831; 198/841; 198/852
[58] Field of Search ............... 198/831, 841, 851, 852, 198/853

[56] References Cited

U.S. PATENT DOCUMENTS

| | | | |
|---|---|---|---|
| 3,669,247 | 6/1972 | Pulver | 198/852 X |
| 3,788,455 | 1/1974 | Dieckmann, Jr. | 198/831 |
| 3,951,256 | 4/1976 | Gurewitz | 198/831 |
| 4,742,907 | 5/1988 | Palmaer | 198/852 X |
| 4,958,726 | 9/1990 | Fett et al. | 198/852 |
| 4,961,492 | 10/1990 | Wiseman et al. | 198/852 X |

OTHER PUBLICATIONS

"Plastic Belting, Strength & Versatility", p. 9 Wiremation Industries, Lumsden Corp.

Primary Examiner—Joseph E. Valenza
Assistant Examiner—Tuan N. Nguyen
Attorney, Agent, or Firm—Richard E. Jenkins

[57] ABSTRACT

A conveyor is made up from a plurality of module bodies 11. The body 11 includes a restraining member 18 having a portion 20 which extends downwardly from the middle of the body 11 under portion 19 which extends outwardly to either side from the lower end of the portion 20. The restraining member 18 co-operates with a sleeve 23 of a fixed guide member 22 to resist movement to the left (when seen in the Figure) or upwards movement of the conveyor portion when the portion undergoes a left hand turn as illustrated schematically by the arrow B.

4 Claims, 4 Drawing Sheets

IMPROVEMENTS IN OR RELATING TO CONVEYORS

This is a continuation of co-pending application Ser. No. 07/523,220 filed on May 14, 1990, now abandoned.

The present invention relates to a conveyor portion, a conveyor, a conveyor arrangement and a method of operating a conveyor arrangement.

BACKGROUND ART

It has been proposed in European Patent Publication No. 0 095 933 (Palmaer) to include a downwardly projecting guide member 32, as shown in FIGS. 7 and 8, which engages a track or guide to resist side loading when a belt follows a curved path. However, no provision is made for any resistance to upwards movement of the conveyor which tends to occur of the outermost part of the conveyor with respect to the turn.

DISCLOSURE OF INVENTION

According to one aspect of the present invention a conveyor portion includes a restraint portion, the restraint portion extending at an angle to the region of the conveyor which, in use, provides support and at an angle to the perpendicular to the region of the conveyor portion which, in use, provides support, the conveyor portion being arranged to comprise part of a conveyor such that, when the conveyor portion comprises part of a conveyor and the conveyor turns to one side, the restraint portion is spaced from the side of the conveyor portion located innermost with respect to the turn, and the restraint portion is arranged to co-operate with a guide to resist inwards movement of the conveyor portion with respect to the turn and also to resist upwards movement of the one side of the conveyor portion located outermost with respect to the turn.

The restraint portion may be arranged to extend inwardly with respect to the turn, when the conveyor portion comprises part of a conveyor and the conveyor portion turns to one side.

When the conveyor portion comprises part of a conveyor and the conveyor turns to one side, the restraint portion may co-operate with a guide to resist inwards movement, and the conveyor portion may be biased against the guide to more firmly resist upwards movement of the side of the conveyor portion located outermost with respect to the turn.

Preferably when the conveyor portion comprises part of a conveyor and the conveyor portion turns to one side, co-operation of the restraint portion with a guide to resist upwards movement of the side of the conveyor portion located outermost with respect to the turn may bias the restraint portion against the guide to more firmly resist inwards movement of the conveyor portion with respect to the turn.

The first direction in which the restraint portion extends may be downwardly with respect to what, in use, will be the region of the conveyor which provides support.

The restraint portion may be located between and spaced from each side of the conveyor portion.

Preferably the restraint portion may include an extension in two opposed directions each at an angle to the perpendicular to the region of the conveyor which, in use, provide support. This feature has the advantage that either of the opposed extensions may be used to enable the conveyor portion to co-operate with a guide such that, when the conveyor portion is incorporated in the conveyor, the conveyor may turn in either direction with the extension in a selected one of the opposed directions being used to resist upwards movement of the side of the conveyor portion located outermost with respect to the turn in either direction., The conveyor portion may comprise a module, which module may be of plastics. The plastics may be injection moulded.

According to another aspect of the present invention, a conveyor may include a plurality of conveyor portions as herein referred to.

According to a further aspect of the present invention a conveyor arrangement may include a conveyor portion as herein referred to and a guide with which the restraint portion is arranged to co-operate.

The conveyor arrangement may include a guide which is located only in the region where the conveyor undergoes a turn.

Preferably the guide may be fixed.

The present invention also includes a method of operating a conveyor arrangement including a plurality of conveyor portions including a restraint portion, the restraint portion extending at an angle to the region of the conveyor which provides support and at an angle to the perpendicular to the region of the conveyor which provides support comprising the restraint portion engaging with a guide when the conveyor turns to one side at a region spaced from the side of the conveyor located innermost with respect to the turn to resist inwards movement of the conveyor portion with respect to the turn and upwards movement of the side of the conveyor portion located outermost with respect to the turn.

The restraint portion may extend in a first direction transverse to what, in use, will be the region of the conveyor which provides support, and in a second direction transverse to the first direction.

The present invention includes any combination of the herein referred to features or limitations.

BRIEF DESCRIPTION OF DRAWINGS

The invention may be carried into practice in various ways, but one embodiment will now be described by way of example only and with reference to the accompanying diagrammatic drawings in which.

DETAILED DESCRIPTION OF DRAWINGS

Figure 1:
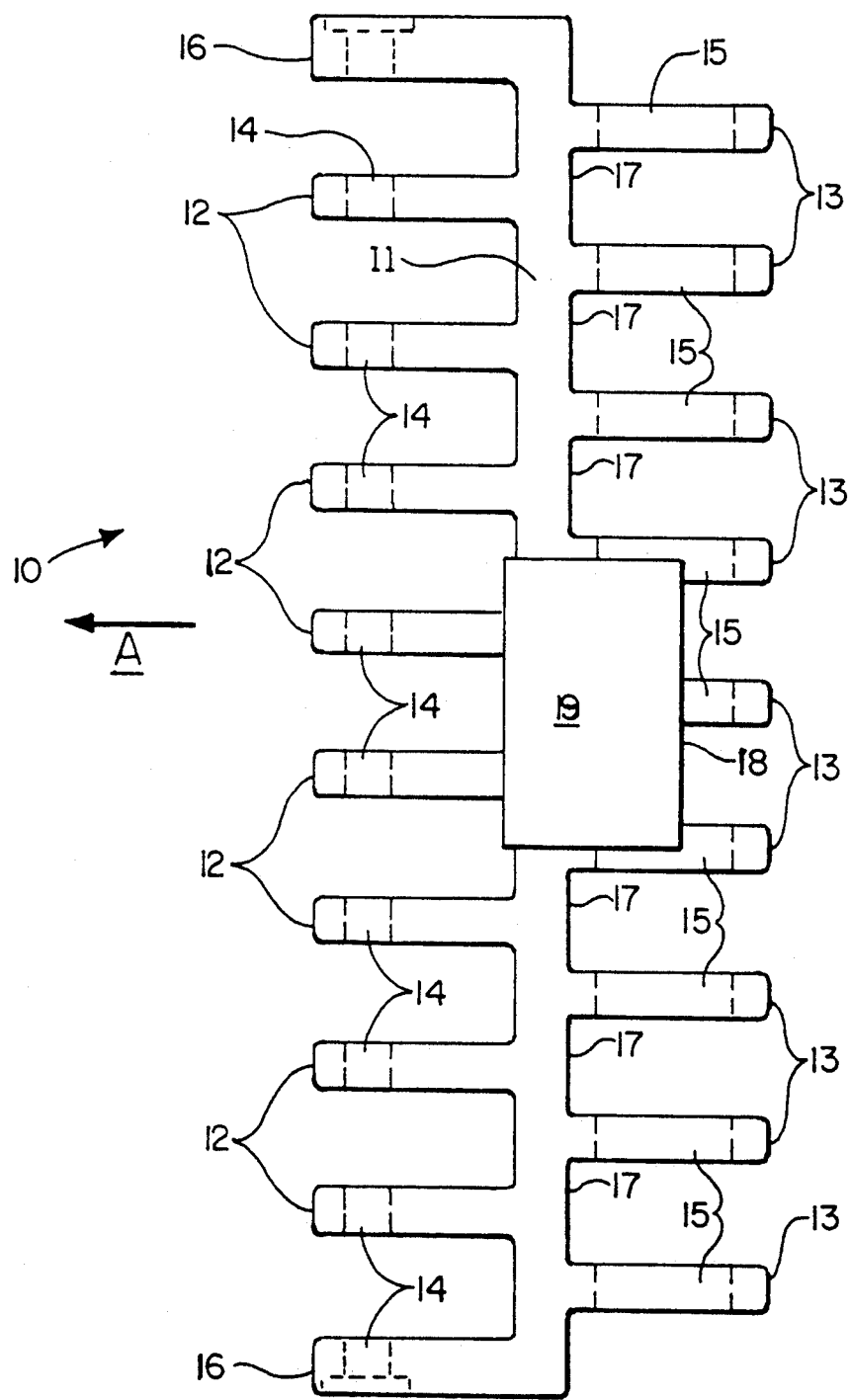
FIG. 1 shows a view from below of a module.

Referring particularly to FIG. 1, a module 10 for use in a conveyor belt has a generally rectangular body 11 with a first set of projections 12 and a second set of projections 13 extending outwardly from the body 11 in opposite directions 13. The first projections 12 have at their ends cylindrical holes 14 and second projections 13 have at their ends elongate holes 15 which are offset so that successive modules may be combined by interweaving their projections, aligning cylindrical holes of one module with the elongated holes 15 of another module and inserting connecting rods (not shown) therethrough.

The ends 16 of the module slide and run in tracks (not shown) and are supported thereby.

The motive force for the conveyor is provided by a sprocket wheel (not shown) the teeth of which co-operate with curved surfaces 17 to propel the module in the direction of arrow A.

The elongated nature of the holes 15 allow, to some extent, a non-parallel alignment of successive modules connected by connecting rods. Hence the conveyor can be made to travel in an arc or bend.

At least some of the modules have a downwardly depending restraining member 18, with a generally rectangular base 19, attached midway along the length of the module body 11.

Figure 2:
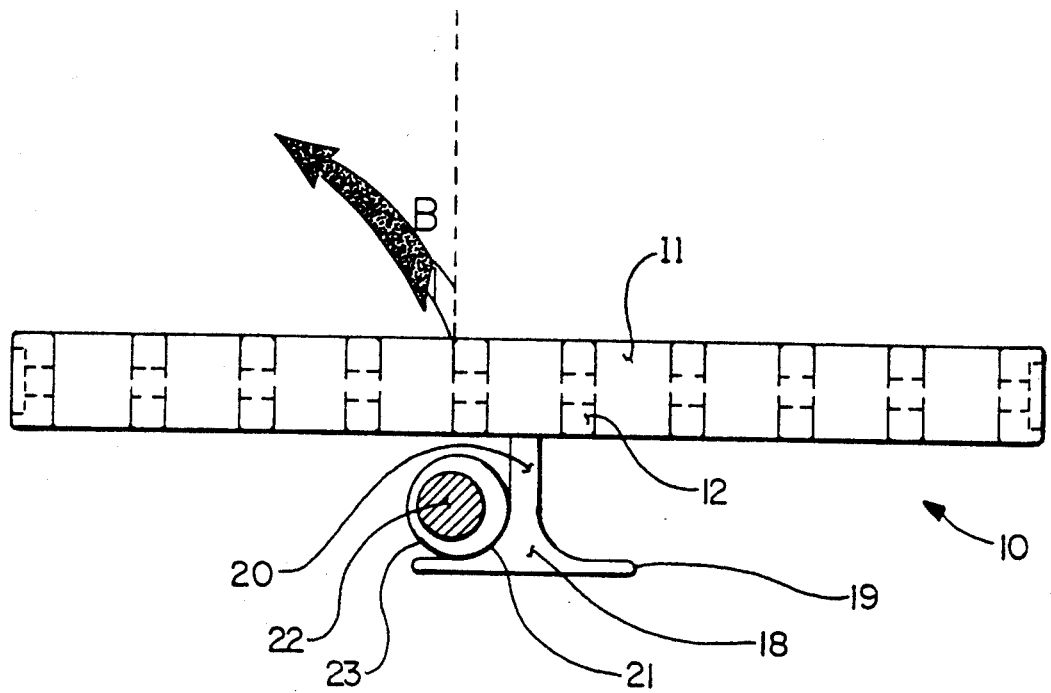
FIG. 2 shows a side view of the module including a section through a length of guide member.
Figure 3:
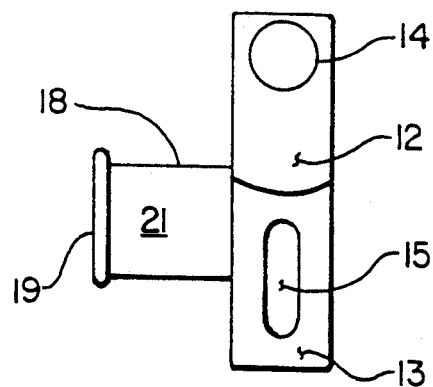
FIG. 3 shows an end view of the module.

Referring now to FIG. 2, the restraining member 18 has a portion 20 which extends downwardly from the body 11 of the module 10 which portion 20 is integral with the base 19.

The surface 21 of the restraining member 18 is generally cylindrical and is arranged to co-operate with the sleeve 23 of a guide member 22 (as the guide member is generally cylindrical, dirt tends to fall off and does not become trapped). The guide member (of which a section is shown) may extend for any length along the conveyor but is particularly useful at a bend.

If the conveyor changes direction so that the guide member 22 forms a left hand bend as shown schematically by arrow B, then the resulting forces caused by the change of direction will tend to push the local portion of conveyor inwardly along a radius of the arc described by the movement of the conveyor, and upwardly resulting in a flipping action about the inner edge of the module.

These forces are resisted by reaction forces exerted by the guide member on the restraint member.

Figure 4:
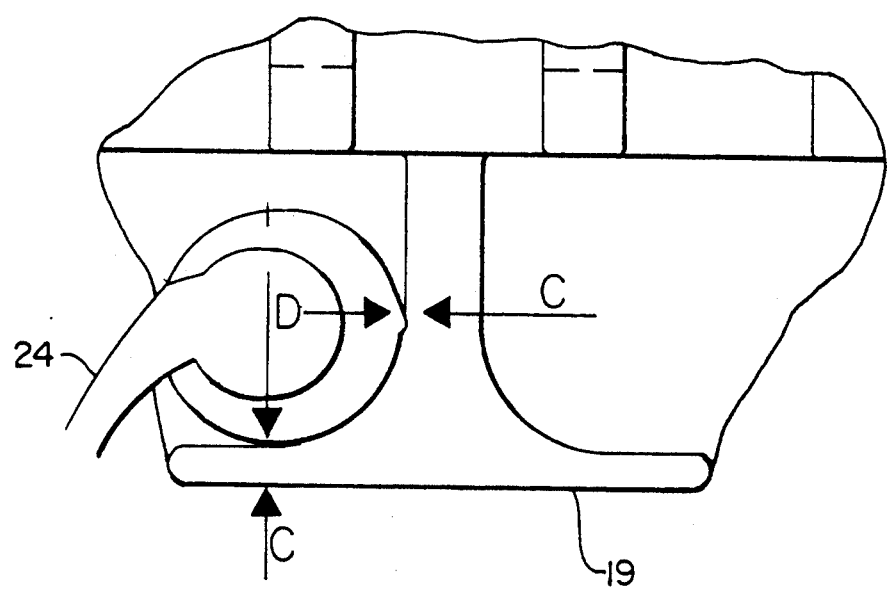
FIG. 4 shows a restraint member co-operating with a guide member.

As illustrated in FIG. 4, the inwards forces exerted on the local conveyor portion as a result of the change of direction may be represented by arrows C.

Arrows D represent reaction forces exerted by the guide member on the restraining member.

It will be seen that the stronger either of the two forces resulting from the change of direction becomes, the less likely the guide member and restraining member will cease to co-operate and therefore it is less likely that a flipping action will ensue.

The guide member is connected to a fixed part of the machine (not shown) via a series of legs 24, and the guide member is deformable such that it can be bent to correspond with the desired direction of travel of the conveyor.

It can be seen that a guide member can be located on either side of the portion 20 to enable the module to cooperate with the guide to resist forces occurring when the module turn in either direction.

Figure 5:
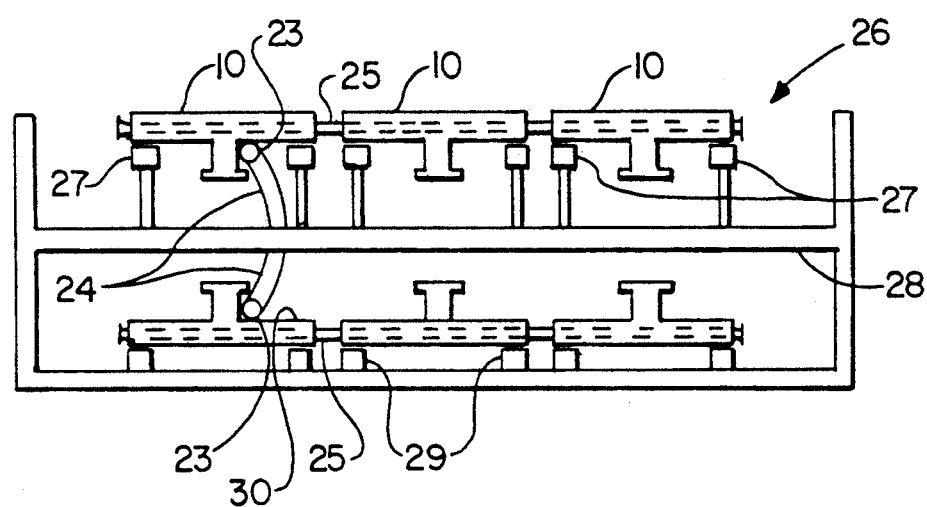
FIG. 5 is a schematic cross-section showing an upper and lower run of a conveyor.

FIG. 5 shows schematically, a cross-section through a conveyor including three modules 10 located side by side. Any number of modules, such as six, may be arranged side by side in order that a conveyor of the required width can be provided. A common axle 25 may extend through each of the modules, as shown, or each module may be provided with a separate axle.

On the upper run 26 of the conveyor, wear strips 27 may be provided at each side of each module extending upwardly from a central support plate 28. These wear strips support the modules and may also serve to provide a reactive force to any attempted turning movement of the modules about the guide 23.

A single guide 23 on the upper and lower modules at outermost region with respect to the curve may be provided. Alternatively that guide could act on one of the other modules or, alternatively or additionally, more than one guide could be provided. The guide 23 is connected by the legs 24 to the support plate 28.

Wear strips 29 support the modules 10 on their return run and the guide 23 co-operates with the portion 20 of the restraining member 18 and what is, in the load carrying position, the underside 30 of the module to resist inwards and upwards movement of the modules on the return run.

What I claim is:

1. A conveyor system comprising:
   (a) a plurality of article supporting conveyor portions;
   (b) a guide spaced from the inside of a turn in the conveyor path;
   (c) at least one vertical supporting slide surface beneath the lateral inside ends of the article supporting conveyor portions; and
   (d) a plurality of restraint portions attached to said conveyor portions including a first portion which faces inwardly with respect to the turn, said restraint portion of a conveyor portion being spaced from the side of said conveyor portion located innermost with respect to the turn, and said restraint portion is arranged to cooperate with said guide to resist inward movement of said conveyor portion with respect to the turn, and a second portion of said restraint portion which extends inwardly with respect to the turn and which faces upwardly and which is adapted to cooperate with the guide to resist upwards movement of the side of said conveyor portion located outermost with respect to the turn, wherein said restraint portions, the inner vertical supporting slide surface and said guide are the sole means of resisting inwards movement of the conveyor portions with respect to the turn and upwards movement of the outer side of said article supporting conveyor portions.

2. A conveyor system according to claim 1 in which said guide extends the complete length of the conveyor.

3. A conveyor system according to claim 1 in which said guide is deformable by bending.

4. A conveyor system according to claim 1 in which said guide is fixed.

* * * * *